(12) United States Patent
Perry et al.

(10) Patent No.: US 6,912,138 B2
(45) Date of Patent: Jun. 28, 2005

(54) SYNCHRONOUS RECTIFIER CONTROL CIRCUIT

(75) Inventors: Marty Perry, Tucson, AZ (US); Ian Poynton, Marana, AZ (US)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 10/650,634

(22) Filed: Aug. 28, 2003

(65) Prior Publication Data

US 2004/0130922 A1 Jul. 8, 2004

Related U.S. Application Data

(60) Provisional application No. 60/407,903, filed on Sep. 3, 2002.

(51) Int. Cl.⁷ ............................................. H02M 3/335
(52) U.S. Cl. ................................ 363/21.06; 363/21.14
(58) Field of Search ......................... 363/21.06, 21.14, 363/127

(56) References Cited

U.S. PATENT DOCUMENTS

| | | |
|---|---|---|
| 4,788,634 A | 11/1988 | Schlecht et al. |
| 5,708,571 A | 1/1998 | Shinada |
| 5,726,869 A | 3/1998 | Yamashita et al. |
| 5,742,491 A | 4/1998 | Bowman et al. |
| 5,784,266 A | 7/1998 | Chen |
| 5,818,704 A | 10/1998 | Martinez |
| 6,011,703 A | 1/2000 | Boylan et al. |
| 6,061,255 A | 5/2000 | Chik et al. |
| 6,081,432 A | 6/2000 | Rinne et al. |
| 6,185,114 B1 | 2/2001 | Matsumoto et al. |
| 6,188,592 B1 | 2/2001 | Farrington et al. |
| 6,222,747 B1 | 4/2001 | Rinne et al. |
| RE37,221 E | 6/2001 | Bowman et al. |
| 6,252,781 B1 | 6/2001 | Rinne et al. |
| 6,256,214 B1 | 7/2001 | Farrington et al. |
| 6,343,026 B1 | 1/2002 | Perry |
| 6,373,734 B1 | 4/2002 | Martinelli |
| 6,459,595 B2 | 10/2002 | Assow |
| 6,459,600 B2 | 10/2002 | Farrington et al. |
| 6,462,965 B1 | 10/2002 | Uesono |
| 6,538,905 B2 | 3/2003 | Greenfield et al. |
| 6,545,883 B2 | 4/2003 | Xing et al. |
| 6,563,725 B2 | 5/2003 | Carsten |
| 6,628,532 B1 | 9/2003 | Rinne et al. |
| 6,711,039 B2 * | 3/2004 | Brkovic ....................... 363/127 |

* cited by examiner

Primary Examiner—Gary L. Laxton
(74) Attorney, Agent, or Firm—Kirkpatrick & Lockhart Nicholson Graham LLP

(57) ABSTRACT

A synchronous rectifier control circuit for controlling a synchronous rectifier of a power converter is disclosed. According to one embodiment, the control circuit includes a differentiator circuit responsive to the output voltage of the power converter. The control circuit also includes a summing circuit responsive to an output of the differentiator circuit and a step function signal. The control circuit further includes an integrator circuit responsive to an output of the summing circuit. In addition, the control circuit includes a gate drive circuit responsive to an output of the integrator circuit and a switching signal that controls a primary switch of the converter. The gate drive circuit also includes an output terminal for coupling to a control terminal of the synchronous rectifier.

35 Claims, 4 Drawing Sheets

SYNCHRONOUS RECTIFIER CONTROL CIRCUIT

CROSS-REFERENCE TO RELATED APPLICATIONS

This application claims priority under 35 U.S.C. §119 to U.S. provisional patent application Ser. No. 60/407,903, filed Sep. 3, 2002, which is incorporated herein by reference.

BACKGROUND OF THE INVENTION

The use of synchronous rectifiers (SRs) is well established in DC-DC power converters to improve the conduction loss of the output stage. When synchronous rectification is applied to a topology, the resultant power converter is transformed into a two-quadrant converter. As such, the converter can sink and source current.

If a back biased load is applied to the output of a power converter during the startup phase, a condition is created that is analogous to placing two converters in parallel. In this configuration, large circulating currents will flow if the two converters are not perfectly matched in voltage and thus have a negative effect on the load and or the power converter system. Therefore, there exists a need in the art for a manner in which a back bias condition can be detected and tolerated by a two-quadrant power converter during the startup phase when the output of the converter is ramping to its set point level.

SUMMARY OF THE INVENTION

In one general aspect, the present invention is directed to a synchronous rectifier control circuit for controlling a synchronous rectifier of a power converter. According to one embodiment, the control circuit includes a differentiator circuit responsive to the output voltage of the power converter. The control circuit also includes a summing circuit responsive to an output of the differentiator circuit and a step function signal. The control circuit further includes an integrator circuit responsive to an output of the summing circuit. In addition, the control circuit includes a gate drive circuit responsive to an output of the integrator circuit and a switching signal that controls a primary switch of the converter. The gate drive circuit also includes an output terminal for coupling to a control terminal of the synchronous rectifier. The synchronous rectifier may be, for example, a MOSFET.

According to various embodiments, the switching signal may be a pulse width modulated (PWM) signal. Additionally, the gate drive circuit may include two complementary FET switches. In addition, the control circuit may include a limiting circuit connected to the integrator circuit for limiting a voltage level of the output of the integrator circuit. Furthermore, the switching signal may be synchronized with the step function signal.

In another general aspect, the present invention is directed to a power converter. According to one embodiment, the power converter includes a switching control circuit for producing a switching signal and a primary switch responsive to the switching signal. The power converter also includes a synchronous rectifier and a synchronous rectifier control circuit. The synchronous rectifier control circuit includes: a differentiator circuit responsive to the output voltage of the power converter; a summing circuit responsive to an output of the differentiator circuit and a step function signal; an integrator circuit responsive to an output of the summing circuit; and a gate drive circuit responsive to an output of the integrator circuit and the switching signal and including an output terminal coupled to a control terminal of the synchronous rectifier. The power converter may be any converter that includes a synchronous rectifier, including a flyback converter, a forward converter, a buck converter, etc., in a single-ended, double-ended and/or multi-phased configuration.

In another general aspect, the present invention is directed to a method of controlling a synchronous rectifier of a power converter. According to one embodiment, the method includes differentiating the output voltage of the power converter. The method also includes summing the differentiated output voltage and a step function signal to thereby generate a summation signal and then integrating the summation signal. The method further includes activating the synchronous rectifier based on the integrated summation signal and the switching signal of the power converter.

According to another embodiment, the method includes differentiating the output voltage of the converter and controlling conduction of the synchronous rectifier in proportion to the differentiated output voltage. The method may also include increasing the rate of increase of a voltage level of a control signal to the synchronous rectifier if the output voltage is monotonic and rising. In addition, the method may further include decreasing the rate of increase of the voltage level of the control signal to the synchronous rectifier if the output voltage is non-monotonic.

According to another embodiment, the method includes differentiating the output voltage of the converter and modulating the synchronous rectifier based on the differentiated output voltage to reduce second quadrant current through the synchronous rectifier. According to this embodiment, the method may also include decreasing the rate of increase of the voltage level of a control signal to the synchronous rectifier when the output voltage is non-monotonic.

BRIEF DESCRIPTION OF THE DRAWINGS

Embodiments to the present invention are described in conjunction with the following figures wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a conventional power converter. For example, certain power converters require a transformer reset mechanism. However, such reset mechanisms are not described herein. Those of ordinary skill in the art will recognize, however, that these and other elements may be desirable in a typical power converter. However, because such elements are well known in the art, and because they do not facilitate a better understanding of the present invention, a discussion of such elements is not provided herein.

All circuit components are assumed to be ideal for the purpose of describing the present invention. In addition, as used herein, the term "ON" is used synonymously with "closed," and the term "OFF" is used synonymously with "open" when referring to the state of a semiconductor switch. Also, as used herein, a semiconductor switch is "ON" when the switch reaches a low-impedance state after the control signal to the switch reaches a suitable level (e.g., voltage) to initiate turn-on of the switch. Similarly, a switch is "OFF" when the switch reaches a high-impedance state after the control signal reaches a suitable level to initiate turn-off of the switch.

Figure 1:
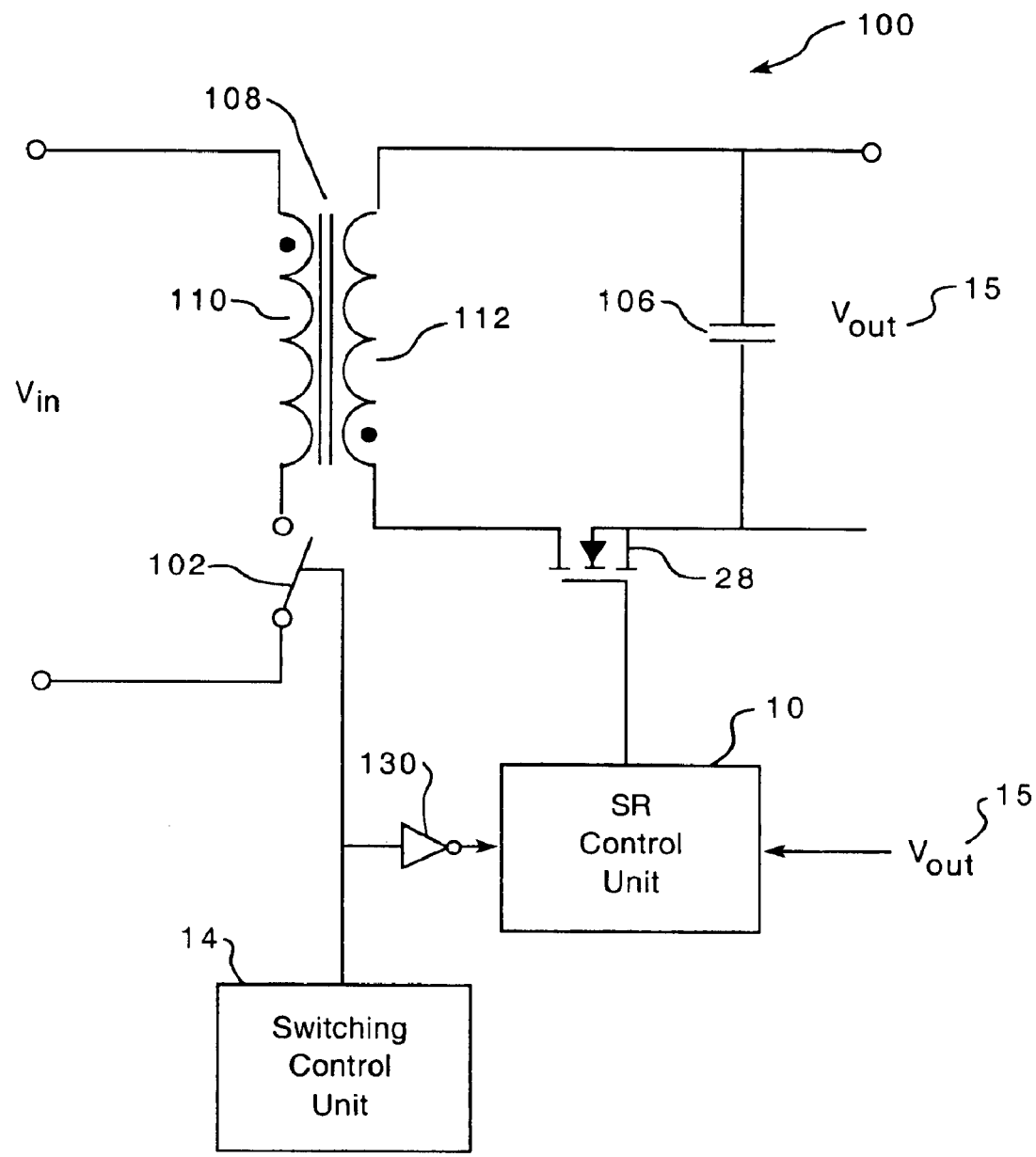
FIG. 1 is a diagram of a power converter according to one embodiment of the present invention.

FIG. 1 is a schematic of a DC-DC power converter 100 according to one embodiment of the present invention. The converter 100 of FIG. 1 is a flyback converter including a primary switch 102 for cyclically coupling the input source (Vin) to a primary winding 110 of the transformer 108. The primary switch 102 is controlled by a switching signal from a switching control circuit 14. In one embodiment, the switching control circuit may be configured to include a pulse width modulated (PWM) control IC. The UCC2808A PWM controller IC from Texas Instruments is one such suitable control IC. The switching control circuit 14 may also include an internal clock that sets the operating frequency of the converter 100. The primary switch 102 may be a semiconductor switch such as, for example, a MOSFET.

A flyback converter stores energy from the input source (Vin) during the ON period of the primary switch 102. That energy is released to the load (not shown) across the output voltage (Vout) 15 during the OFF period of the primary switch 102. Energy stored in the output capacitor 106 is supplied to the load during the ON period of the primary switch 102.

As illustrated in FIG. 1, the converter 100 includes a synchronous rectifier (SR) 28 coupled to the secondary winding 112 of the transformer 108 for rectifying the voltage across the secondary winding 112. As illustrated in FIG. 1, the SR 28 may be configured as a MOSFET responsive to a SR control circuit 10, to be described in more detailed hereinbelow. In one embodiment of the present invention, the SR control circuit 10 may be responsive to the output voltage (Vout) 15 of the converter 100. In addition, the SR control circuit 10 may be responsive to the switching signal (e.g., PWM signal) from the switching control circuit 14. According to one embodiment, the switching signal from the switching control circuit 14 may be coupled to an input terminal of the SR control circuit 10 via an inverter 130, as illustrated in FIG. 1.

Figure 2:
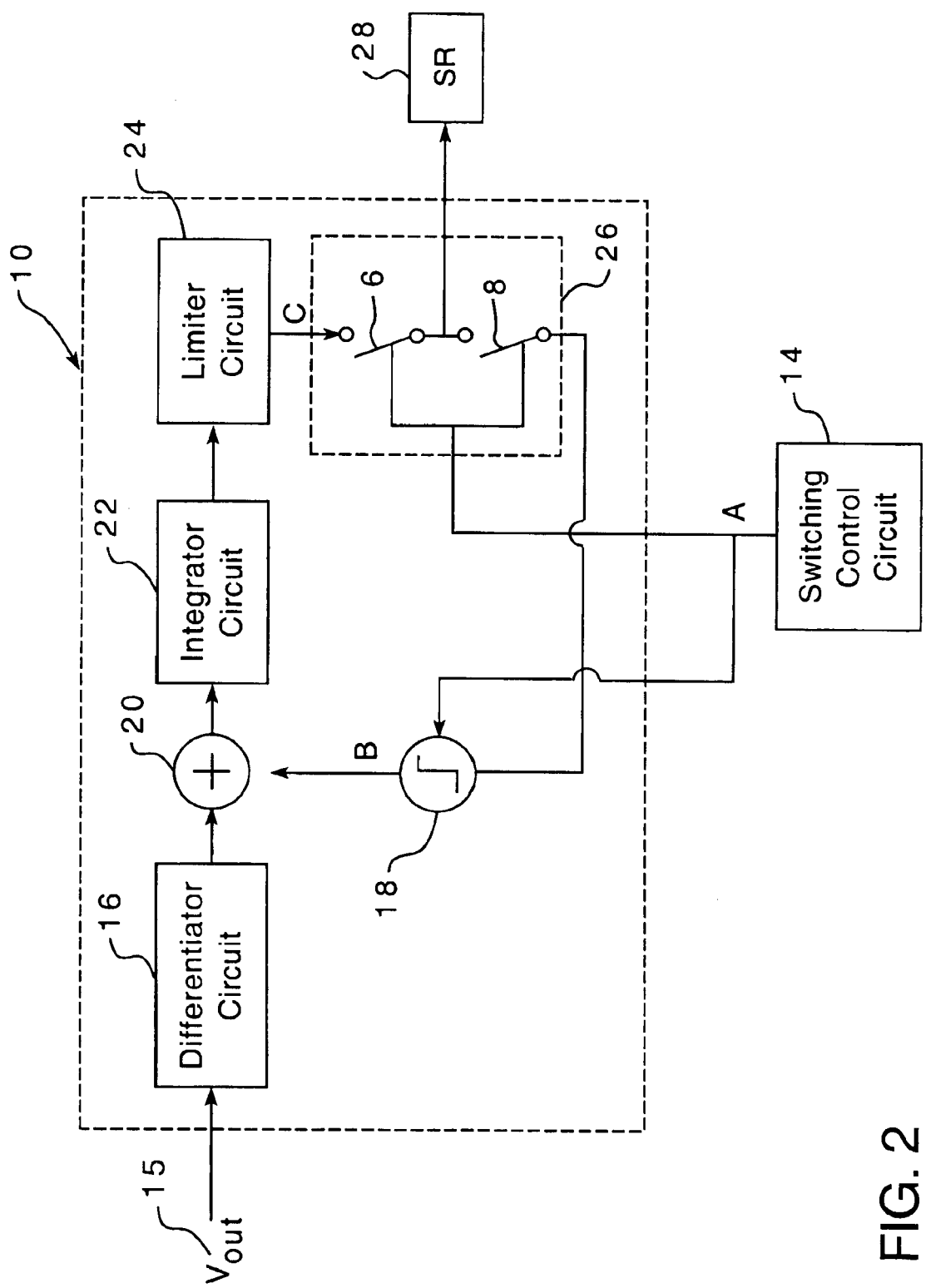
FIG. 2 is a diagram of a synchronous rectifier (SR) control circuit of FIG. 1 according to one embodiment of the present invention.
Figure 3:
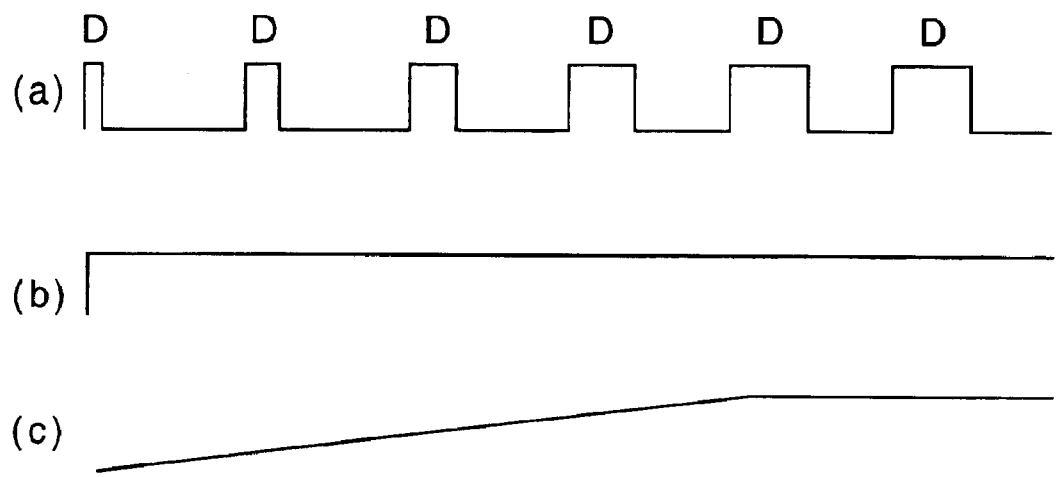
FIGS. 3 and 4 are waveform diagrams illustrating the operation of the SR control circuit of FIG. 2 according to one embodiment of the present invention.

FIG. 2 is a schematic of the SR control circuit 10 of FIG. 1 according to one embodiment of the present invention. The SR control circuit 10 may control one or more SRs 28 of a power converter (such as the SR 28 shown in FIG. 1). In one embodiment of the present invention, the SR control circuit 10 may include, as illustrated in FIG. 2, a differentiator circuit 16, a step function generator circuit 18, a summing circuit 20, an integrator circuit 22, and a limiter circuit 24. In addition, the SR control circuit 10 may include a gate drive circuit 26, including two complementary switches 6, 8, which may be implemented as MOSFETs. The differentiator circuit 16 differentiates the output voltage (Vout) 15 of the power converter 100. The summing circuit 20 may then sum the differentiated output voltage from the differentiator circuit 16 with a step function signal B from the step function generator circuit 18. According to one embodiment, the step function signal B may be synchronized with a switching signal A, such as is shown in FIG. 3. The integrator circuit 22 may then integrate the output from the summing circuit 20 (sometimes referred to herein as the "summation signal").

The switches 6, 8 of the gate drive circuit 26 may be responsive to the switching signal A from the switching control circuit 14. That is, for example, when the switching signal A (in FIG. 3) is high, switch 8 is ON and switch 6 is OFF. Alternatively, when the switching signal A (in FIG. 3) is low, switch 8 is OFF and switch 6 is ON. The integrated summation signal from the integrator circuit is coupled to the control terminal of the SR 28 via the gate drive circuit 26 (i.e., when switch 6 is ON). In addition, as illustrated in FIG. 2, the limiter circuit 24 may be coupled between the integrator circuit 22 and the gate drive circuit 26 to limit the voltage level of the integrated summation signal.

The differentiator circuit 16, the summing circuit 20, and the integrator circuit 22 may be configured with operational amplifiers (op-amps), as is known in the art. For a further description regarding circuit configurations of op-amps, interested readers may refer to *The Electronics Handbook*, published by CRC Press (1996), Chapter 41, which is incorporated herein by reference.

The SR control circuit 10 may control the SR 28 during the startup phase of the converter 100 so that the SR 28 can be deployed as a controlled rectifier. In this manner, the second quadrant current can be controlled by shunting the output current through the body diode of the SR 28 as required (the body diode of the SR is not shown). In this configuration, the SR 28 is ramped on during the startup sequence if the output is monotonic and rising; however, if the output rate changes or reverses, the gate drive level of the SR 28 will be controlled in such a way as to eliminate the second quadrant current.

Figure 4A:
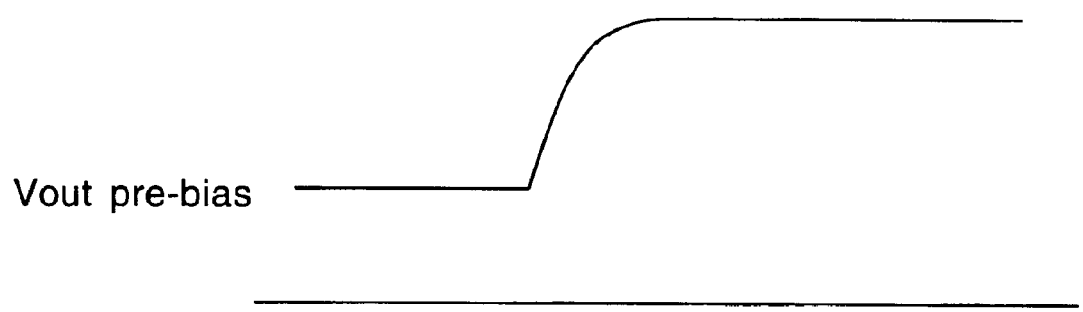
Figure 4B:
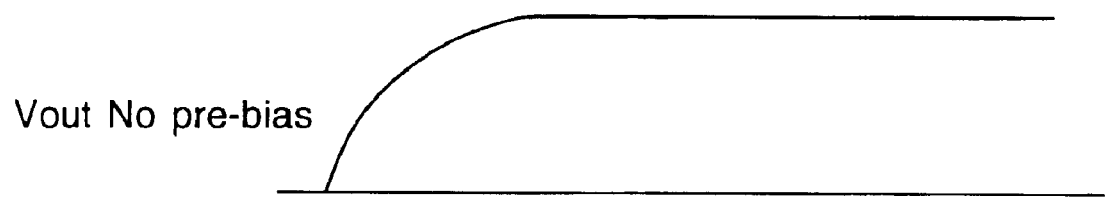

The operation of the converter 100 is now described with reference to FIGS. 3 and 4. As detailed in FIG. 3, signal A represents the switching signal (e.g., PWM signal) in a soft start mode. This is represented by the expanding D interval as a function of time. In normal operation, this signal would be controlled in such a manner as to ramp the converter output voltage (Vout) 15 in a controlled fashion. This is detailed in the waveforms of the output voltage (Vout) under normal non-pre-biased conditions (see FIG. 4(b)). The voltage at node C represents the applied gate voltage for the SR 28. The ramp function at node C brings the SR 28 into conduction in a controlled manner during the startup interval. If the output voltage (Vout) is monotonically rising, the output of differentiator circuit 16 will reinforce the step function signal B to force full conduction of SR 28 prior to the steady state operating point of the switching signal A. This will force the converter 100 to always be in the continuous mode, thus mitigating the need for a preload.

Now consider the case where output capacitor 106 is pre-charged to a voltage that is greater than zero but lower than the steady state operating point of the converter 100. In this case, the controlled operating point of the converter 100 at startup will be below the pre-charged voltage at Vout. In an uncontrolled case, the SR 28 would conduct current in the second quadrant thus discharging capacitor 106. The SR control circuit 10, however, will detect this as a rate change via differentiator circuit 16, thus reducing the ramp rate of signal C. This has the effect of reducing the second quadrant current by modulating the gate drive of the SR 28. This is detailed in the waveform of Vout under pre-biased conditions (see FIG. 4(a)). This waveform indicates that the converter 100 functions in a fashion analogous to a single quadrant converter with a pre-biased output.

Figure 5:
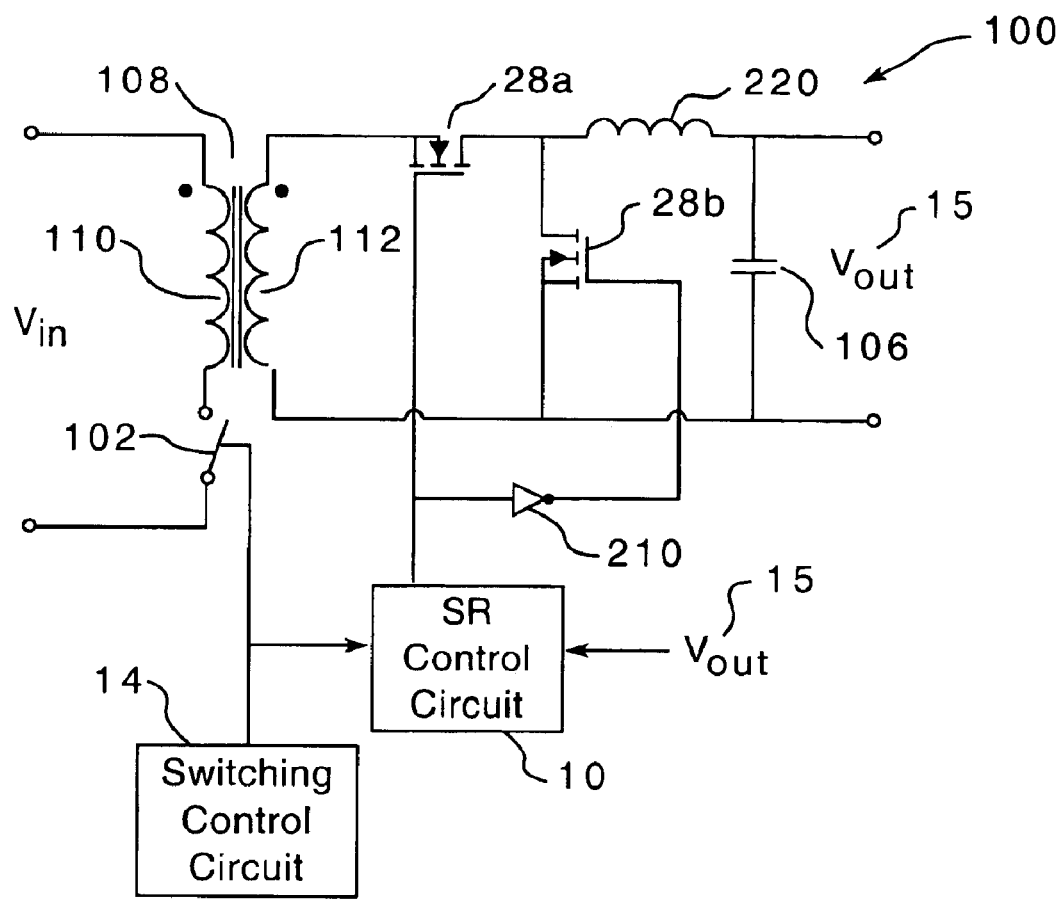
FIGS. 5 and 6 are diagrams of power converters according to other embodiments of the present invention.

The SR control circuit 10 may be employed for any converter topology utilizing synchronous rectifiers. For example, FIG. 5 is a schematic of converter 100 configured in a forward mode including the SR control circuit 10. Configured in a forward mode, the converter 100 of FIG. 5 includes two SRs $28_a$, $28_b$. The first SR $28_a$ rectifies the voltage across the secondary winding 112 and the second SR $28_b$ acts as the freewheeling rectifier. An output filter, comprising the output capacitor 106 and an inductor 220, filters the output voltage (Vout). In a forward converter, energy is transferred forward from the primary winding 110 to the secondary winding 112 of the transformer 108 during the ON period of the primary switch 102. The operation of forward converters is known in the art and, therefore, not further described herein. As shown in FIG. 5, the drive signal from the SR control circuit 10 to the second SR $28_b$ may be inverted, by inverter 210, because the SRs $28_a$, $28_b$ may alternatively conduct.

Figure 6:
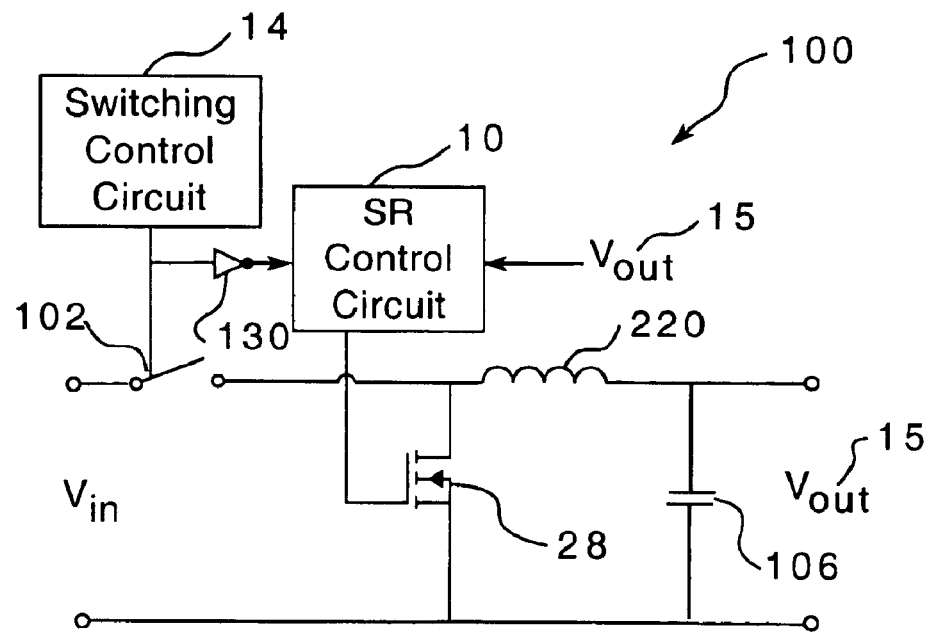

FIG. 6 illustrates a power converter 100 in the buck mode employing the SR control circuit 10. The SR control circuit 10 controls the conduction of the SR 28 in the buck converter 100 of FIG. 6. The operation of buck converters is known in the art, and therefore, not further described herein.

The present invention is also directed to a method of controlling a SR of a power converter. According to one embodiment, the method may include generating a summation signal by differentiating the output voltage (Vout) of the power converter 100 and summing the differentiated output voltage (Vout) and a step function signal. The step function signal applied to the primary switch of the converter may be synchronized with the switching signal (e.g., PWM Signal). In addition, the method may also include integrating the summation signal and activating the SR 28 based on: (i) the integrated summation signal; and (ii) the switching signal of the power converter 100. To activate the SR 28, this method may further comprise limiting the voltage level of the integrated summation signal applied to the control terminal of the SR 28.

According to another embodiment, the method may include differentiating the output voltage (Vout) of the converter 100 and controlling conduction of the SR 28 in proportion to the differentiated output voltage (Vout). This method of controlling conduction of the SR 28 may involve increasing the rate of increase of a voltage level of a control signal to the SR 28 if the output voltage (Vout) is monotonic and rising. Alternatively, if the output voltage (Vout) is non-monotonic, the method may control conduction of the SR 28 by decreasing the rate of increase of the voltage level of the control signal to the SR 28.

According to yet another embodiment, the method may include differentiating the output voltage (Vout) of the converter 100 and modulating the SR 28 based on the differentiated output voltage (Vout) to reduce second quadrant current through the SR 28. According to this embodiment, modulating the SR 28 may include decreasing the rate of increase of the voltage level of a control signal to the SR 28 when the output voltage (Vout) is non-monotonic.

The flyback, forward and buck converters shown previously are examples of the types of converters that may employ the SR control circuit 10 and associated methods of the present invention. As stated previously, any converter topology utilizing synchronous rectification may employ the SR control circuit method. This includes, but is not limited to, single ended and double ended converters, half bridge and full bridge converters, integrated forward/flyback converter, etc. In addition, the SR control circuit 10 may be used to control multiple SRs in, for example, interleaved or multi-phased converters. For example, because the signal at node C in FIG. 2 is a time-averaged signal that may be slower than the switching frequency of the converters (e.g., the frequency of the signal at node A), one SR control circuit 10 may be used to control multiple SRs in interleaved converters, i.e., paralleled converters operating out of phase. For such an embodiment, the SR control circuit 10 may include a separate gate drive circuit 26 for each SR to be controlled by the SR control circuit 10. The output signal from the limiter circuit 24 may be input to each of the separate gate drive circuits 26 for such an embodiment. According to one embodiment, the separate gate drive circuits 26 may be integrated with their respective SR 28.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A synchronous rectifier control circuit for controlling a synchronous rectifier of a power converter, wherein the power converter is for producing an output voltage and includes a primary switch responsive to a switching signal, the control circuit comprising:
    a differentiator circuit responsive to the output voltage of the power converter;
    a summing circuit responsive to an output of the differentiator circuit and a step function signal;
    an integrator circuit responsive to an output of the summing circuit; and
    a gate drive circuit responsive to an output of the integrator circuit and the switching signal, the gate drive circuit including an output terminal for coupling to a control terminal of the synchronous rectifier.

2. The control circuit of claim 1, wherein the gate drive circuit includes two complementary switches.

3. The control circuit of claim 2, wherein the switches of the gate drive are FETs.

4. The control circuit of claim 1, further comprising a limiting circuit coupled between the integrator circuit and the gate drive circuit.

5. The control circuit of claim 1, wherein the switching signal is a pulse width modulated (PWM) signal.

6. The control circuit of claim 1, wherein the step function signal is synchronized with the switching signal.

7. The control circuit of claim 1, wherein the synchronous rectifier includes a MOSFET.

8. A synchronous rectifier control circuit for controlling a synchronous rectifier of a power converter, wherein the power converter is for producing an output voltage and includes a primary switch responsive to a switching signal, the control circuit comprising:
    a differentiator circuit having an input terminal responsive to the output voltage of the power converter;
    a summing circuit having a first input terminal coupled to an output terminal of the differentiator circuit and having a second input terminal responsive to a step function signal;
    an integrator circuit having an input terminal coupled to an output terminal of the summing circuit; and
    a gate drive circuit having a first input terminal coupled to an output of the integrator circuit, having a second input terminal responsive to the switching signal, and having an output terminal for coupling to a control terminal of the synchronous rectifier.

9. The control circuit of claim 8, wherein the gate drive circuit includes two complementary switches.

10. The control circuit of claim 9, wherein the switches of the gate drive are FETs.

11. The control circuit of claim 8, further comprising a limiting circuit, wherein the limiting circuit includes an input terminal coupled to the output terminal of the integrator circuit and includes an output terminal coupled to the first input terminal of the gate drive circuit.

12. The control circuit of claim 8, wherein the switching signal is a pulse width modulated (PWM) signal.

13. The control circuit of claim 8, wherein the step function signal is synchronized with the switching signal.

14. The control circuit of claim 8, wherein the synchronous rectifier includes a MOSFET.

15. A control circuit for a synchronous rectifier of a power converter, wherein the power converter is for producing an output voltage and includes a primary switch responsive to a switching signal, the control circuit comprising:
    means for differentiating the output voltage of the power converter;
    means for summing the differentiated output voltage and a step function signal to thereby generate a summation signal;
    means for integrating the summation signal; and
    means for activating the synchronous rectifier based on the integrated summation signal and the switching signal.

16. The control circuit of claim 15, further comprising means for limiting the integrated summation signal.

17. The control circuit of claim 15, wherein the switching signal is a pulse width modulated (PWM) signal.

18. The control circuit of claim 15, wherein the step function signal is synchronized with the switching signal.

19. A power converter for producing an output voltage, comprising:
    a switching control circuit for producing a switching signal;
    a primary switch responsive to the switching signal;
    a synchronous rectifier; and
    a synchronous rectifier control circuit including:
        a differentiator circuit responsive to the output voltage of the power converter;
        a summing circuit responsive to an output of the differentiator circuit and a step function signal;
        an integrator circuit responsive to an output of the summing circuit; and
        a gate drive circuit responsive to an output of the integrator circuit and the switching signal and including an output terminal coupled to a control terminal of the synchronous rectifier.

20. The power converter of claim 19, wherein the gate drive circuit includes two complementary switches.

21. The power converter of claim 20, wherein the switches of the gate drive are FETs.

22. The power converter of claim 19, wherein the control circuit further comprises a limiting circuit, wherein the limiting circuit is coupled between the integrator circuit and the gate drive circuit.

23. The power converter of claim 19, wherein the switching signal is a pulse width modulated (PWM) signal.

24. The power converter of claim 19, wherein the step function signal is synchronized with the switching signal.

25. The power converter of claim 19, wherein the synchronous rectifier includes a MOSFET.

26. The power converter of claim 19, wherein the power converter is one of a forward converter, a flyback converter and a buck converter.

27. The power converter of claim 19, further comprising a transformer and wherein:
    the primary switch is coupled to a primary winding of the transformer; and
    the synchronous rectifier is coupled to a secondary winding of the transformer.

28. The power converter of claim 27, wherein the transformer transfers energy from the primary winding to the secondary winding during the ON period of the primary switch.

29. The power converter of claim 27, wherein the transformer stores energy from the primary winding during the ON period of the primary switch.

30. The power converter of claim 19, wherein:
    the power converter is an interleaved converter including a second synchronous rectifier; and
    the synchronous rectifier control circuit includes a second gate drive circuit responsive to the output of the integrator circuit and the switching signal, the gate drive circuit further including an output terminal coupled to a control terminal of the second synchronous rectifier.

31. The power converter of claim 19, further comprising an inverter coupled between the switching control circuit and the synchronous rectifier control circuit.

32. A method of controlling a synchronous rectifier of a power converter, wherein the power converter is for producing an output voltage and includes a primary switch responsive to a switching signal, the method comprising:
    differentiating the output voltage of the power converter;
    summing the differentiated output voltage and a step function signal to thereby generate a summation signal;
    integrating the summation signal; and
    activating the synchronous rectifier based on the integrated summation signal and the switching signal of the power converter.

33. The method of claim 32, further comprising limiting the integrated summation signal.

34. The method of claim 32, wherein the switching signal is a pulse width modulated (PWM) signal.

35. The method of claim 32, wherein the step function signal is synchronized with the switching signal.

* * * * *